A. P. MORROW.
CHUCK.
APPLICATION FILED MAY 11, 1911.
1,159,248.
Patented Nov. 2, 1915.
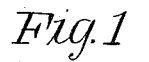
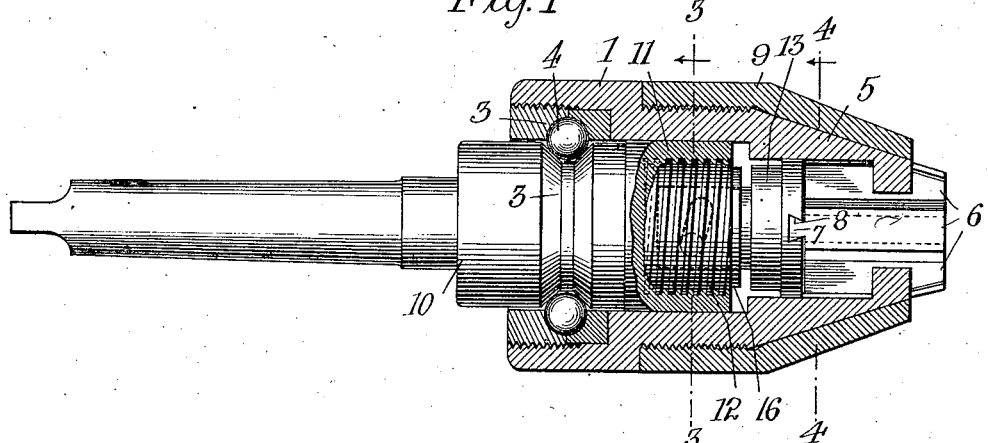
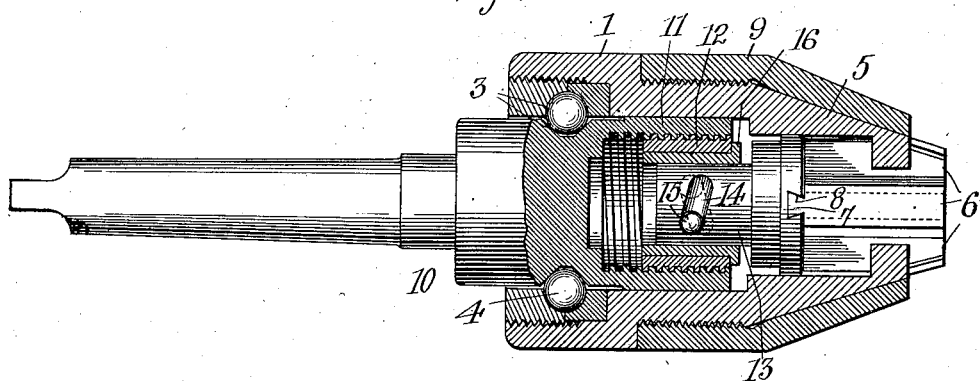
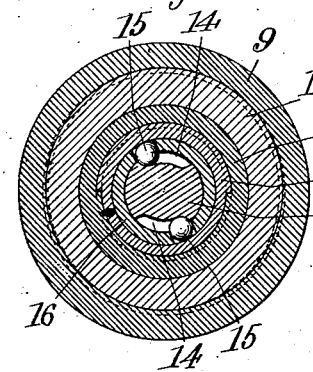
Witnesses
Joseph C. Stack
R. W. Bishop
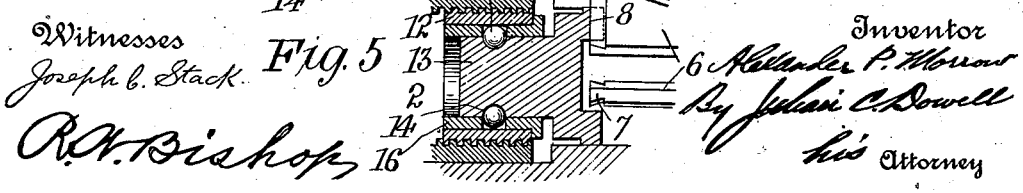
Inventor
Alexander P. Morrow
By Julian C. Dowell
his Attorney

UNITED STATES PATENT OFFICE.

ALEXANDER P. MORROW, OF ELMIRA, NEW YORK, ASSIGNOR TO E. HORTON & SON COMPANY, OF WINDSOR LOCKS, CONNECTICUT, A CORPORATION OF CONNECTICUT.

CHUCK.

1,159,248. Specification of Letters Patent. Patented Nov. 2, 1915.

Original application filed December 23, 1908, Serial No. 469,025. Divided and this application filed May 11, 1911. Serial No. 626,503.

*To all whom it may concern:*

Be it known that I, ALEXANDER P. MORROW, a citizen of the United States, residing at Elmira, in the county of Chemung and State of New York, have invented certain new and useful Improvements in Chucks, of which the following is a specification.

My invention relates to chucks having sliding jaws which grasp and hold the shank of a drill or other tool.

This application is a division of my application filed December 23, 1908, Serial No. 469,025. No claim is made herein to the generic invention set forth and broadly claimed in my aforesaid application, the claims of this application being directed to a species of the invention which is shown but not specifically claimed in that application.

In using chucks the jaws frequently become so set under the resistance offered the drill by the work that it is exceedingly difficult to release and retract the jaws and considerable power is expended, time lost, and inconvenience experienced in starting the releasing action of the chuck.

The object of my invention is to provide simple and efficient means whereby the jaws may be easily and quickly caused to relax their grip and then recede with the expenditure of less power and exertion than has previously been required to accomplish that result.

One construction wherein the object of my invention is attained is illustrated in the accompanying drawings and is hereinafter fully described, the novel features being indicated in the claims.

In the drawings, Figure 1 is a longitudinal sectional elevation of a drill chuck embodying my invention. Fig. 2 is a similar view showing more of the parts in section. Fig. 3 is a transverse section on the line 3—3 of Fig. 1. Fig. 4 is a transverse section on the line 4—4 of Fig. 1. Fig. 5 is a detail longitudinal section.

This invention is applicable to chucks of any form and I have illustrated it, in the present case, as applied to a chuck comprising a smooth-bored outer tubular body or case 1 and a sectional head 2 fitted therein and including an intermediate element 11 within which is screwed an inner part 12. Said intermediate element and the body or case proper are shown as having annular raceways 3 in which are positioned balls 4 whereby relative axial movement of said parts is prevented while the relative rotary movement thereof is facilitated. The body or case proper 1 has a frusto-conical end portion 5 constructed with a plurality of longitudinal slots which hold and guide the jaws 6 by which the shank of a drill or other tool is grasped and held. The jaws are so connected to the head that they may have simultaneous radial and axial movement, the connection illustrated consisting of dovetailed tenons 7 on the inner ends of the jaws slidably fitted in radial grooves 8, of corresponding shape, in the forward end of the head. The jaws may be provided with marginal ribs engaging recesses formed along the edges of the slots and they are confined in the slots by a frusto-conical sleeve or cap 9 secured upon the body as shown.

The intermediate member 11 is rigid with the stem 10 and has its internally threaded portion fitting in the smooth bore of the body or outer casing 1. The inner part 12 of the head 2 has a spindle or plug 13 telescopically journaled in its open end wherein it is adapted to have a slight axial movement relative to said part 12. The grooves 8 are formed in the end of this plug or spindle, as shown in Figs. 1, 2 and 5. In the surface of the spindle or plug are circumferential grooves 14 which are disposed at an angle to the axis of the head somewhat greater than the pitch of the threads upon the members 11 and 12. These grooves 14 are engaged by rolling elements 15 which are shown as balls fitted in holes through a bushing or retainer 16 secured within the bore of the part 12. While I have herein shown a roller, it is to be understood that I am not limited thereto, as any other suitable unattached keying member may be employed.

In operation, the case 1 rotating about the head will impart rotary movement to the jaws which will in turn transmit rotary movement to the part 12. The rotary movement of said part 12 will be accompanied by an axial movement thereof, due to the threaded mounting of the same in the intermediate element 11. In this axial movement the jaws will, of course, participate so that they will be moved along the inclined or conical portion of the case and thereby caused to open or close radially to grasp or release the shank of the drill or other tool. Assuming, now, that the jaws are closed upon the tool, if the body or case be rotated in the proper direction to release the tool, such rotation will be transmitted through the jaws to the spindle or plug 13. The plug will then turn within the part 12 independently of the same until the end of the groove 14 reaches the ball or roller 15, whereupon the ball will act as a key to lock the plug or spindle to said part 12, so that the continued rotation of the former will rotate the latter. As the groove 14 is angularly disposed in relation to the axis of the spindle or plug, the side walls thereof will act as cams against the roller, which is held against displacement by the bushing 16, and said plug or spindle will consequently have a longitudinal or axial movement which is limited by the ends of the groove engaging the roller. It will thus be seen that the roller and groove serve as a cam and stop device to impart a limited initial movement to the spindle prior to the rotation of the part 12 and this initial movement will cause the jaws to relax their grip on the work, the subsequent rotation of the head causing the jaws to open fully in the well-known manner. As a result of the described construction and operation, the power required to start the screw is decreased and the manipulation of the chuck is rendered easy and rapid from the beginning to the end of the operation.

It is to be understood that the rollers and grooves may be multiplied or decreased and other minor changes made without departing from the spirit and scope of the invention as defined in the following claims.

Having thus described my invention, what I claim and desire to secure by Letters Patent is:

1. In a chuck, the combination with a head including an outer element and an inner part adapted to have rotary and axial movement relative to one another, of radially movable jaws adapted to receive axial movement from said inner part as it is moved in said outer element, means including a cam and a roller engaging the same for permitting a limited rotary movement and thereby effecting axial movement of said jaws relative to said inner part, and means whereby axial movement of the jaws causes radial movement thereof.

2. In a chuck, the combination with a head including an outer element and an inner part adapted to have rotary and axial movement with respect to said element, of a spindle carried by said inner part, radially movable jaws carried by said spindle, means including a cam and a roller engaging the same for permitting a limited rotary movement and thereby effecting axial movement of said spindle and jaws relative to said inner part, and means whereby axial movement of the jaws causes radial movement thereof.

3. In a chuck, the combination with a head including an internally threaded element and a part threaded to screw into said element, of radially movable jaws adapted to receive axial movement from said inner part as it is turned in the threaded element, means including a cam and a roller engaging the same for permitting a limited rotary movement and thereby effecting axial movement of said jaws relative to said inner part, and means whereby axial movement of the jaws causes radial movement thereof.

4. In a chuck, the combination with a head, of a case rotatably mounted on the head, radially disposed jaws, means for imparting radial movement to said jaws from their axial movement with respect to the case, and means including a cam and a roller engaging the same for permitting a limited axial movement and thereby effecting radial movement of the jaws relative to the head for initially releasing said jaws.

5. In a chuck, the combination with a head, of a case, radially disposed jaws carried by said head and movable axially relative to said case, means whereby said jaws are moved radially by such relative axial movement, and means including a cam and a roller engaging the same permitting a limited rotary movement and thereby effecting axial movement of the case and jaws with respect to the head for producing an initial radial movement of said jaws.

6. In a chuck, the combination of a tubular case, jaws connected therewith and movable radially by axial movement of the case relative to the jaws, a head within the case composed of telescoping parts, a cam in one of said parts, and a roller in the other part engaging said cam, said roller and cam permitting a partial rotary movement of the case and jaws without moving the head and producing relative axial movement between the case and the jaws to effect an initial release of the jaws.

7. In a chuck, the combination of a rotatable case, jaws operatively connected therewith to be moved radially by axial movement of the case relative to the jaws, a sectional head within the case and co-acting therewith to move the jaws, and a cam and a roller engaging the same arranged to permit a limited rotary movement of the case and jaws to produce relative axial movement between the case and the jaws to initially release the jaws during such limited rotary movement.

8. In a chuck, the combination of a rotatable case, jaws operatively connected therewith to be moved radially by axial movement of the case relative to the jaws, a head within the case co-acting therewith to operate the jaws, a spindle journaled in the head and engaging the jaws, a cam on the spindle and a roller in the head bearing upon the cam, said roller and cam permitting a limited rotary movement and thereby effecting axial movement of the case, jaws and spindle with respect to the head for producing an initial radial movement of said jaws.

9. In a chuck, the combination of a rotatable case, jaws operatively connected therewith to be moved radially by axial movement of the case relative to the jaws, a threaded head within the case co-acting therewith to operate the jaws, a spindle journaled in the head and having a circumferential cam groove disposed at a greater angle to the axis of the head than the threads thereof, said spindle being engaged by the jaws, and a roller held against axial displacement in the head and engaging said cam groove, said roller and cam groove permitting a limited rotary movement and thereby effecting axial movement of the case, jaws and spindle with respect to the head for producing an initial radial movement of said jaws.

10. In a chuck, the combination with a head including an outer element and an inner part adapted to have rotary and axial movement with respect to said element, of a spindle carried by said inner part, radially movable jaws carried by said spindle, a roller and a cam between said spindle and inner part of the head for permitting a limited rotary movement and thereby effecting axial movement of the spindle and jaws relative to said inner part of the head, and means whereby axial movement of the jaws causes radial movement thereof.

11. In a chuck, the combination of an open-ended head, a spindle journaled in the head, radially disposed jaws engaging the spindle, means for rotating said jaws and moving them radially, and a cam and a roller engaging the same arranged in the open end of the head and connecting the spindle thereto whereby the spindle and jaws may have a limited movement axially with respect to said head.

12. In a chuck, work-engaging means and operating means therefor comprising two movable, interconnecting parts to receive and to convey motion in causing engagement and release of the work-engaging means, said parts having engaging means to effect a joint movement in tightening and releasing the work, and including a keying member unattached to said parts, and whereby one of said parts is movable with respect to the other by a predominating, relatively fast movement, to effect initial release of the work-engaging means, and whereby the other of said parts is movable with respect to the first by a subsidiary, relatively slow movement, to finally tighten the hold of the work-engaging means.

13. In a chuck, work-engaging means and operating means therefor comprising two movable, interconnecting parts to receive and to convey motion in causing engagement and release of the work-engaging means, said parts having engaging means to effect a joint movement in tightening and releasing the work, and including a roller, and whereby one of said parts is movable with respect to the other by a predominating, relatively fast movement, to effect initial release of the work-engaging means, and whereby the other of said parts is movable with respect to the first by a subsidiary, relatively slow movement, to finally tighten the hold of the work-engaging means.

In testimony whereof I affix my signature, in presence of two witnesses.

ALEXANDER P. MORROW.

Witnesses:
   H. W. PATON,
   FLORENCE G. FOSTER.